United States Patent [19]
Yellowley et al.

[11] Patent Number: 5,222,017
[45] Date of Patent: Jun. 22, 1993

[54] CONTROL SYSTEM TO SYNCHRONIZE SLAVE COMPUTERS

[75] Inventors: Ian Yellowley, West Vancouver; Philip R. Pottier, Vancouver, both of Canada

[73] Assignee: The University of British Columbia, Vancouver, Canada

[21] Appl. No.: 617,156

[22] Filed: Nov. 23, 1990

[51] Int. Cl.[5] .............................................. G05B 15/00
[52] U.S. Cl. ..................................... 364/132; 318/625
[58] Field of Search ............................. 364/131–138, 364/228–230.5, 242.94–242.5; 318/625; 395/200, 325

[56] References Cited

U.S. PATENT DOCUMENTS

| | | | |
|---|---|---|---|
| 4,351,025 | 9/1982 | Hall, Jr. ............................... | 364/133 |
| 4,467,436 | 8/1984 | Chance et al. ....................... | 364/133 |
| 4,631,684 | 12/1986 | Akasofa et al. ................. | 364/474.11 |
| 4,698,746 | 10/1987 | Goldstein ............................. | 364/200 |
| 4,858,101 | 8/1989 | Stewart et al. ....................... | 364/131 |
| 4,879,644 | 11/1989 | Gottshall ............................. | 364/132 |
| 4,937,741 | 6/1990 | Harper et al. ......................... | 364/200 |
| 4,945,486 | 7/1990 | Nitschke et al. ..................... | 364/133 |
| 4,977,581 | 12/1990 | Cerminara ........................... | 364/131 |
| 5,008,805 | 4/1991 | Fiebig et al. ......................... | 364/132 |
| 5,025,200 | 6/1991 | Kurakake et al. ................... | 318/625 |
| 5,032,975 | 7/1991 | Tamamoto et al. ................. | 364/134 |
| 5,072,374 | 12/1991 | Sexton et al. ........................ | 364/132 |
| 5,083,074 | 1/1992 | Suzuki et al. ........................ | 318/625 |
| 5,142,470 | 8/1992 | Bristow et al. ...................... | 364/132 |
| 5,159,503 | 10/1992 | Mitamura et al. .................. | 318/625 |
| 5,175,680 | 12/1992 | Yoneda et al. ....................... | 318/625 |

Primary Examiner—Jerry Smith
Assistant Examiner—Jim Trammell
Attorney, Agent, or Firm—C. A. Rowley

[57] ABSTRACT

A multi-operation control system includes a plurality of slave computers each controlling its respective operation and forming at least one operating system. Each slave computer has a memory for storing a plurality of sequential movement instructions to be carried out by the slave and the micro-controller. Each slave computer monitors the operation it controls, compares the monitored operation with the current movement instruction and generates a flag signal if the monitored operation and current movement instruction differ by more than a preselected amount. This flag signal is transmitted to all of the slave computers of the operating system of which the slave computer is a part. The slave computers carry out their movement instructions in steps in working time increments. The step of movement to be carried out in a time increment is updated only when no flag signal is received by the slave computers, i.e. if any one of the slave computers generates a flag signal, the step of movement to be carried out in the time increment remains the same for all of the slave computers belonging to that operating system. The timing of all slave computers (working time increment) of a given operating system are synchronized by a coordinating computer that provides coordinating pulses to all of the slave computers in the operating system thereby to synchronize all slave computers of that operating system. A single master controller may be used to update the operating instructions in all of the slave computers including the coordinating computers in a plurality of operating systems. Flag signals may be generated and transmitted to the slaves of its operating system by other monitoring devices such as slaves computers that monitor technological achievements or economic results when a monitored parameter or set of actions traverse preselected limits.

10 Claims, 2 Drawing Sheets

CONTROL SYSTEM TO SYNCHRONIZE SLAVE COMPUTERS

FIELD OF THE INVENTION

The present invention relates to a multi-operation control system to monitor, correlate and control a large number of axes of motion. More particularly the present invention relates to a multi-operational control system wherein each operation (axis) is individually controlled and all operations (axis) are governable by various parameters including economic and technological parameters in parallel with geometric information.

BACKGROUND TO THE INVENTION

It is well known to control individual operations of multi-operational systems such as a robot or machine tool by applying a velocity control mode wherein time increments ($\delta t$) for each movement are set and the desired distance is input (manually or by a programmed computer) thereby to provide $\delta d$ (distance) per time increment for each control element. In some conventional systems the desired distance or location for a given or selected axis is compared with the sensed or actual location and the difference between the two positions, namely the actual and desired positions (locations, velocities etc.), determines in conjunction with a given or selected algorithm an amplification factor applied to the signal controlling the given axis i.e. if the difference is great the amplification is greater so that the power applied or speed applied to the given axis is increased accordingly thereby tending to make that axis move more rapidly into its desired location.

When a plurality of operations are used in combination the use of a common synchronizing pulse to define $\delta t$ is not uncommon, however it will be apparent that if any one operation is lagging a significant difference in operating sequence may develop and the desired synchronization between the operations may be lost.

Also such systems may not readily lend themselves to the integration of technological, geometric or economic information in a manner which allows modification of the parameters such as axes velocity without transferring such data through a master CPU.

BRIEF DESCRIPTION OF THE PRESENT INVENTION

It is an object of the present invention to provide a multi-operation control system wherein a single master computer may control a number of different independently operating systems each of which includes a number of slave microcontrollers and associated hardware and software controlled by a coordinating computer.

It is a further object of the present invention to provide a multi-operational control system limiting disparity between actual operation (displacement, speed, temperature, pressure, etc) and operating instructions.

Broadly the present invention relates to a multi-operation control system comprising a plurality of slave computers, each controlling its respective operation, said slave computers forming at least one operating system of said multi-operation control system, each said slave computer having a memory means for storing a plurality of movement instructions, each of said slave computers including means for dividing each of said movement instruction into a plurality of steps each of which is intended to be carried out in a working time increment, a coordinating computer for each said operating system formed by said slave computers, each said coordinating computer providing synchronizing pulses to each of said slave computers of its respective operating system thereby to synchronize said working time increments of all of said slave computers in its respective operating system, each of said slave computers having means for monitoring its respective operation, a means to compare its monitored operation with the then current step of said movement instructions it is attempting to execute and a means to generate a flag signal if said monitored operation and said then current step of said movement instructions differ by more than a preselected value, means for transmitting any flag signal so generated by any one of said plurality of slave computers to all of said plurality of said slave computers in said operating system of which said slave computer generating said flag signal forms a part, means for updating the then current step of said movement instructions with the next step of said movement instructions to be executed in the next working time increment when no flag signal is received by said slave computer or for repeating the said then current step of said movement instructions if a flag signal is received.

Preferably a master computer means will monitor said movement instructions in memory in said slave computers and will update said plurality of movement instructions stored in said memory when some of said movement instructions have been completed.

Preferably said master computer will control a plurality of said operating systems.

Preferably further slave means will be provided to monitor parameters, actions or results and to generate flag signals and transmit said flag signals to each of said slave computers of its respective said operating system if a monitored parameter, action or result traverses a preset threshold.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
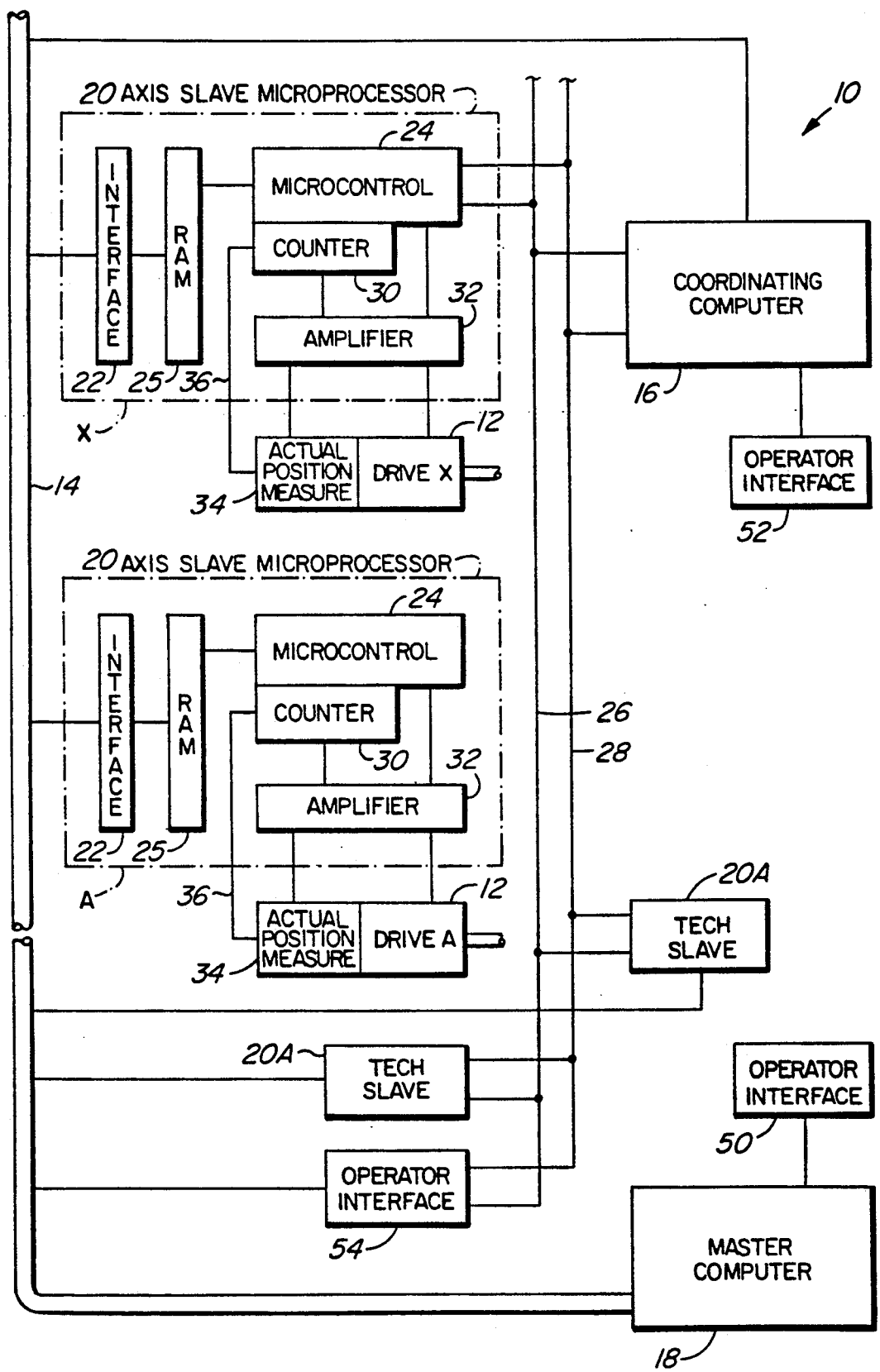
FIG. 1 is a schematic illustration of a single work station or machine control incorporating a plurality of axis/slave computers and technical slaves.

The operating system 10 illustrated in FIG. 1 is composed of a plurality of micro-controller controlled operations symbolically designated as operations A and X. Each of the operations A-X is controlled by an axis controller or slave computer 20 which operates an axis motor 12 and communicates with a coordinating computer 16 (which may be also a slave computer 20 for controlling an operation) and a main or master computer 18 that may be used to a control a plurality of systems 10 of the type shown in FIG. 1.

Each of the slave computers or axis controllers 20 includes a special purpose printed circuit board having an interface 22 to the high speed bus 14 which allows input and output of information to its general purpose micro-controller 24 and its bi-port random access memory (RAM) 25.

Sequential movement instructions for each slave computer (provided and up-dated by a master computer as will be described below) are stored in the RAM 25 and are splined into a plurality of steps of movement each to be carried out in a working time increment by the micro-controller 24. Such splining smooths the command trajectory and results in a much smoother operation of the controlled equipment.

The micro-controller 24 is programmed to actuate one of two algorithms at a (constant) frequency equal to the spline frequency or working time increment which is regulated and controlled as will be described in more detail hereinbelow by the occurrence of a leading edge transmitted from the coordinating computer 16 and transmitted on digital in/out (I/O) line 26. One of the algorithms loads the next step or increment of movement from the random access memory 25 to permit it to be processed whereas the other of the two algorithms does not load the next step or increment of movement and the previous step (or basic algorithm) is repeated.

Each system 10 may be composed of a plurality of slave computer 20 or technical slaves 20A each of which may generate a flag signal and transmit same via line 28 to all of the slave elements (including the coordinating computer 16 which may well be a slave computer).

The axis slave computers 20 receive a signal from a measuring device 34 that measures the actual operation (displacement, rate of displacement, position, etc.) of its respective drive 12 and transmits the current position to a counter or comparer 30, communicating with the micro-controller 24 in its respective slave computer 20. This counter or comparer 30 compares the actual operation with the instruction or step of movement supplied to the comparer via the micro-controller 24. It generates in conjunction with an appropriate motion control algorithm a signal to be transmitted to line 28 to effectively raise a flag (figuratively) signal, (e.g. vector increase the potential in line 28) if the difference between the measured operation and the instruction (then current step of movement) exceeds a preselected limit. Obviously the acceptable limit will vary depending on the operation being controlled.

Flag signals may also be generated by other types of slave computer such as the technical or economic slaves indicated by reference numeral 20A which also transmit the flag signals to the line 28 should the criteria being monitored by these technical or economic slaves 20A e.g. temperature, pressure, or any other desired parameter or set of interacting parameters or economic projections or calculations traverse a preselected threshold. For example if a technical slave 20A is monitoring a process involving several steps and the process does not achieve a preset result at the appropriate time the technical slave 20A may be programmed to raise a flag. Similarly if the economics of an operation are being calculated and the results indicate that the required economics are not being satisfied the economic slave 20A may raise a flag signal.

The particular algorithm actuated by the micro controller 24 in each of the slave computers 20 of the operations A to X will be dependent on the state of line 28, i.e. whether or not any one of the slave axis controllers 20 or the technical slaves 20A generate a flag signal. For example, if the line 28 carries a high potential controller 24 of each slave 20 in the system 10 will load the next function, i.e. the next step or increment of movement to the position counter 30 and apply the required algorithm to update the then current position. On the other hand, should the line 28 be for example be at low potential the micro-controller 24 will not update counters 30 so that the then current step of movement is retained and repeated and operation performed will correspond with the then current step of movement without update.

It will be apparent that some of the axis motors 12 may have completed their task during the allotted working time increment. Since step of movement to be carried out by these axis motors 12 also are not up-dated when a flag signal is received these axis motors will remain idle whereas those axis motors 12 which have not completed their task as defined in the then current step of movement will again attempt to complete the same task or step. Obviously when flag signals are acted upon and the steps of movement are not up-dated the speed or velocity of the operation will be reduced accordingly.

The output of the selected or activated algorithm thus forms a command signal to the amplifier or similar power electronic device 32 which drives the axis motor 12 of its respective operation A-X.

Coordination of the various slave drives 12 of an operating system 10 is of central importance. The line 26 allows the transmission of the synchronizing timing pulses to each of the slave computers 20 currently connected to that line 26, i.e. forming part of the operating system 10. Thus each of the slave computers 20 receives essentially the same timing pulses and δt or the spline frequency of each of the slaves of any one system 10 is essentially the same.

Generally as above indicated a master frequency will be imposed on each operating system by the master computer 18. Normally this master frequency will be in the order of between 10 and 1,000 hertz and the working pulses applied by the coordinating computer 16 will divide master frequency into between 5 to 250 working time increments which are used by the slaves to spline their movement instructions into the smaller steps of movement.

Figure 2:
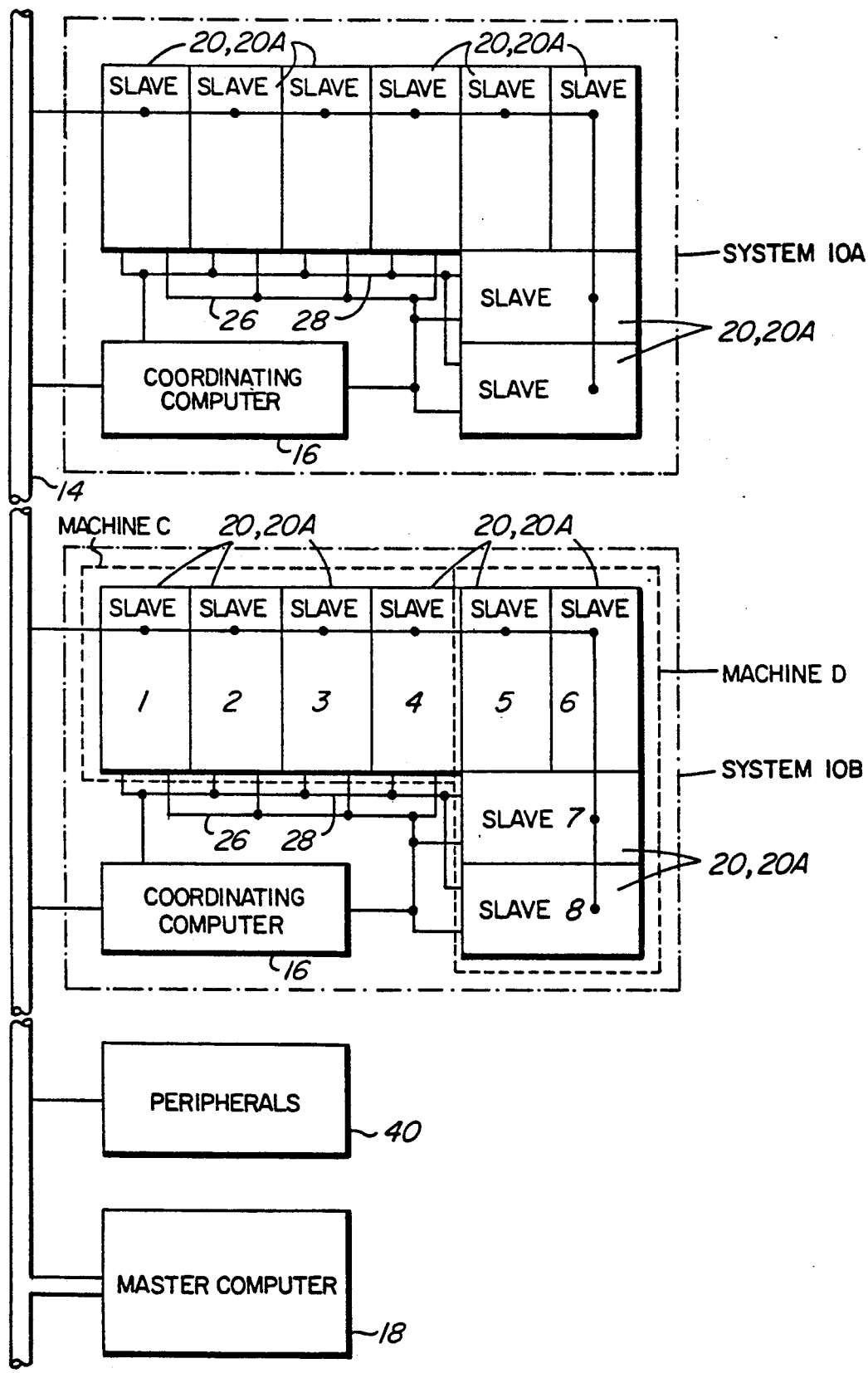
FIG. 2 is a simple schematic illustration of a plurality of work stations of the type illustrated in FIG. 2 controlled by a control computer in accordance with the present invention.

It will be apparent from FIG. 2 that a single master computer 18 may be used to control a plurality of different individual systems 10 such as those indicated at 10A and 10B. The actual numbers of systems 10A, 10B, etc. may vary significantly and that each of the systems 10 may actually include more than one operating machine, for example as indicated by the dotted lines in the system 10B of FIG. 2, two machines, namely machines C and D have been shown as being part of a single system 10B. This may be advantageous, for example, to control a lathe, e.g. the operation of the cutting tool of the lathe in conjunction with another machine possibly for feeding the lathe or any other suitable combination of machines as may be desired to operate in relative synchronization. Each of the systems 10, 10A, 10B, etc. will have its own coordinating computer 16 and a plurality of operating slaves and/or technical slaves 20, 20A respectively. As above indicated the coordinating computers 16 of each of the systems 10, 10A, 10B etc. may in effect be a slave equivalent to the slaves 20, 20A, etc. but having the additional function of generating synchronizing pulses forming the working time increments and transmitting them to the other slaves of the system to which it belongs.

As illustrated the system 10B is composed of two machines, namely machine C and D. Each of these machines is composed of a plurality of different slaves, for example the machine C includes slaves 1,2,3 and 4 while machine D includes slaves 5,6,7 and 8.

As above indicated, each of the slave computers 20, 20A, etc. has a bi-port RAM 26 which can be read by both the slave micro-controllers 24 and the master computer 18. This RAM 26 stores the required increments of movement for that particular slave computer 20 and deletes them as they are completed. The main or master computer 18 reads instructions remaining in the memory of each of the slaves 20 of each of the systems 10 and updates the movement instructions or commands in the RAM 26 or each slave computer when a preselected number of previously supplied movement instructions have been implemented. Thus the movement instruction increments from the master computer 18 are stored in the memory 26 which functions as a buffer and are read by the slave micro-controller 24 and implemented. The master (computer 18) updates the instructions periodically as the earlier instructions are implemented.

Based on the size of the buffer, i.e. the memory 26, the master frequency, the maximum update frequency of the slaves by the master computer 18 and the number of splined increments (working time increments) it is straight forward to estimate the maximum allowable time between updates from the master 18 so that the buffer or memory 26 is read by the master 18 and if required filled at fixed time intervals.

Operator interfaces such as those illustrated at 50, 52 and 54 of FIG. 1 permit the operator to input to the master computer 18, the coordinating computer 16, and/or all of the slaves 20. While three interfaces have been shown, it is possible to operate with only a single interface through the master computer or a second interface operating all of the slave computers 20 and the coordinating computer 16 in a given system 10.

The master computer 18 may also be used in conjunction with peripheral as shown schematically at 40 in FIG. 2.

Having described the invention modifications will be evident to those skilled in the art without departing from the spirit of the invention as defined in the appended claims.

We claim:

1. A multi-operation control system comprising a plurality of slave computers, each controlling its respective operation, said slave computers forming at least one operating system of said multi-operation control system, each said slave computer having a memory means for storing a plurality of instructions, each of said slave computers including means for dividing each of said movement instruction into a plurality of working steps each of which is intended to be carried out in a working time increment, a coordinating computer for each said operating system, each said coordinating computer including a first transmitting means for transmitting synchronizing pulses to each said slave computers of its respective operating system thereby to define and synchronize said working time increments of all of said slave computers in its respective operating system, each of said slave computers having means for monitoring its respective operation, a means to compare its monitored operation with the then current said working step it is attempting to execute and a means to generate a flag signal if said monitored operation and said then current said working step differ by more than a preselected value, second transmitting means for transmitting any flag signal so generated by any one of said plurality of slave computers to all of said plurality of said slave computers in said operating system of which said slave computer generating said flag signal forms a part, means for updating the then current said working step with the next said working step to be executed in the next said working time increment when no flag signal is received by said slave computer or for repeating the said then current said working step if a flag signal is received.

2. A control system as defined in claim 1 further comprising a master computer means to monitor said instructions in said memories in said slave computers and to up-date said plurality of instructions stored in said memories when some of said instructions have been completed.

3. A control system as defined in claim 2 wherein said master computer controls a plurality of said operating systems.

4. A control system as defined in claim 1 further comprising further slave means to monitor selected parameters, actions or results and to generate further flag signals and transmit said further flag signals to each of said slave computers of its respective said operating system if a monitored parameter, action or result traverses a preset threshold.

5. A control system as defined in claim 2 further comprising further slave means to monitor selected parameters, actions or results and to generate further flag signals and transmit said further flag signals to each of said slave computers of its respective said operating system if a monitored parameter, action or result traverses a preset threshold.

6. A control system as defined in claim 3 further comprising further slave means to monitor selected parameters, actions or results and to generate further flag signals and transmit said further flag signals to each of said slave computers of its respective said operating system if a monitored parameter, action or result traverses a preset threshold.

7. A method of controlling a multi-operation system incorporating a plurality of slave computers, each controlling its respective operation, said slave computers forming at least one operating system of said multi-operation system, said method comprising defining a plurality of working steps for each said operation of each said slave computers intended to be carried out in a working time increment, providing synchronizing pulses to each said slave computers of said one said operating system to define and synchronize said working time increments of all of said slave computers in said one operating system, monitoring said operation of each said slave computer, comparing said monitored operation of each said slave computer with the then current said working step it is attempting to execute and generating a flag signal if said monitored operation and said then current working step differ by more than a preselected value, transmitting any flag signal so generated by any one of said plurality of slave computers to all of said plurality of said slave computers in said operating system of which said slave computer generating said flag signal forms a part, updating the then current said working step with the next said working step to be executed in the next working time increment when no flag signal is received by said slave computer or repeating the said then current said working step if a flag signal is received.

8. A method as defined in claim 7 further comprising monitoring said movement instructions in said memories in said slave computers and up-dating said plurality of movement instructions stored in said memories when some of said movement instructions have been completed.

9. A method as defined in claim 7 further comprising monitoring selected parameters, actions or results and generating a further flag signals and transmitting said further flag signals to each of said slave computers of its respective said operating system if a monitored parameter, action or result traverses a preset threshold.

10. A method as defined in claim 8 further comprising monitoring selected parameters, actions or results and generating a further flag signal and transmit said further flag signal to each of said slave computers of its respective said operating system if a monitored parameter, action or result traverses a preset threshold.

* * * * *